United States Patent
Nakajima et al.

(10) Patent No.: US 7,617,279 B2
(45) Date of Patent: Nov. 10, 2009

(54) IMAGE-PRINTING SYSTEM USING PEER-TO-PEER NETWORK

(75) Inventors: Nobuyoshi Nakajima, San Jose, CA (US); Yoshiaki Watanabe, Saitama (JP); Yasuhiko Nagaoka, San Jose, CA (US)

(73) Assignee: Fujifilm Corporation, Tokyo (JP)

( * ) Notice: Subject to any disclaimer, the term of this patent is extended or adjusted under 35 U.S.C. 154(b) by 774 days.

(21) Appl. No.: 10/373,703

(22) Filed: Feb. 27, 2003

(65) Prior Publication Data

US 2004/0172440 A1 Sep. 2, 2004

(51) Int. Cl.
G06F 15/16 (2006.01)
(52) U.S. Cl. .................... 709/204; 709/201; 709/217; 709/219; 709/229; 358/1.15; 358/1.16
(58) Field of Classification Search ......... 709/217–219, 709/227–229, 203, 201, 204; 358/1.15–1.16
See application file for complete search history.

(56) References Cited

U.S. PATENT DOCUMENTS

| | | | | |
|---|---|---|---|---|
| 5,666,215 | A * | 9/1997 | Fredlund et al. ............ 358/487 |
| 5,974,401 | A | 10/1999 | Enomoto et al. |
| 6,017,157 | A | 1/2000 | Garfinkle et al. |
| 6,292,267 | B1 * | 9/2001 | Mori et al. ................. 358/1.15 |
| 6,552,816 | B1 * | 4/2003 | Shima ....................... 358/1.15 |
| 6,757,684 | B2 * | 6/2004 | Svendsen et al. ............. 707/10 |
| 6,779,004 | B1 * | 8/2004 | Zintel .......................... 709/227 |
| 6,816,270 | B1 * | 11/2004 | Cooper et al. .............. 358/1.13 |
| 7,068,309 | B2 * | 6/2006 | Toyama et al. ........... 348/231.5 |
| 7,079,268 | B1 * | 7/2006 | Tanaka ...................... 358/1.15 |
| 7,082,200 | B2 * | 7/2006 | Aboba et al. ................. 380/273 |
| 7,287,088 | B1 * | 10/2007 | Anderson .................... 709/235 |
| 7,363,278 | B2 * | 4/2008 | Schmelzer et al. ............ 705/67 |
| 2003/0187673 | A1 * | 10/2003 | Needham et al. ............... 705/1 |
| 2004/0085576 | A1 * | 5/2004 | Paz-Pujalt et al. .......... 358/1.15 |
| 2004/0139172 | A1 * | 7/2004 | Svendsen et al. ............ 709/219 |
| 2006/0242238 | A1 * | 10/2006 | Issa ............................. 709/204 |

FOREIGN PATENT DOCUMENTS

JP 10-78619 A 3/1998
JP 11-224228 A 8/1999

* cited by examiner

Primary Examiner—Saleh Najjar
Assistant Examiner—Faruk Hamza
(74) Attorney, Agent, or Firm—Birch, Stewart, Kolasch & Birch, LLP

(57) ABSTRACT

An entertainment is provided in which a limited number of persons can share images through a peer-to-peer network, and a device is provided for allowing anyone to easily get a print having a desired finish quality at the nearest lab store with no uploading procedure. A peer-to-peer server enters a closed user group (CUG) and issues a password necessary for login to the CUG. It is possible to share an image between client terminals having the same password through peer-to-peer connection. It is possible to directly transmit the shared image to an order-accepting server of the nearest lab store through peer-to-peer connection and print the image. Moreover, when a user designates an image-processing condition on a client terminal, the information on the condition is sent to and managed by a client-managing server. The lab that receives a print order extracts the favorite information of the client concerned from the client-managing server and provides a print having the desired finish quality.

14 Claims, 14 Drawing Sheets

IMAGE-PRINTING SYSTEM USING PEER-TO-PEER NETWORK

BACKGROUND OF THE INVENTION

1. Field of the Invention

The present invention relates to an image-printing system using a peer-to-peer network, particularly to a system preferred to realize an image-providing service of sharing an image between restricted persons and allowing the persons to easily get prints, and a user terminal unit used for the system.

2. Description of the Related Art

Most of digital-camera users move image data from a recording medium of a memory card or the like to a hard disk of a personal computer when the recording medium becomes full as a result of taking pictures. When the total number of images stored in the hard disk is small, there is no problem. However, when the total number of images increases, it is difficult to extract a desired image from the hard disk and finally, it is impossible to extract an image.

This is because many image files having the same file name are present on the hard disk of the personal computer and thereby, it is impossible to retrieve an image in accordance with its file name. Even if a duplicate file name is not present, it is difficult to get the contents of an image from the file name because the file name automatically provided by a digital camera is normally constituted by a combination string of alphabetical letters and numerals and it is rare to remember the file name of the desired image. Moreover, it requires a lot of time to check all thumbnails by image-viewing software (image viewer) and therefore, it is not realistic to check them by the software.

Furthermore, though it is possible to manually add an identifiable name to a file name, the identifiable-name-inputting step requires a lot of time. Therefore, this method is not realistic either. As a result, valuable image data is stored in a hard disk while it is not used.

However, the number of pleasures of sharing image data on a network slowly increases in recent years. For example, by uploading image data to a predetermined server and e-mailing a URL of the image-storing place to another person, the image data can be shared by a plurality of persons (Japanese Patent Application Publication No. 11-224228 and U.S. Pat. No. 5,974,401).

In general, because the storage capacity (space) of the server is limited, the client must decrease the capacity of image data by occasionally decreasing the number of pixels of the image to be opened to the public or compressing the image data if necessary while considering the capacity of the server. Moreover, it is necessary to perform uploading whenever replacing images and the time and labor for uploading are necessary.

Furthermore, the number of cases for ordering prints of image data via a network has increased in recent years. Most of the cases use a style of collecting orders on one place or a plurality of places and printing the orders and delivering the prints to houses of clients by mail (U.S. Pat. No. 6,017,157 and Japanese Patent Application Publication No. 10-78619).

In the case of the above-described conventional print-ordering system (system of collecting orders on a place), when the number of orders increases, the processing at the place becomes a bottleneck and the cost for removing the bottleneck also increases. Moreover, there is a disadvantage that the service cost increases by a mail cost (cost of delivery to client's house).

Moreover, there is a problem that even if a client understands that an image can be processed in accordance with the user's taste, it is impossible to easily reflect the processing condition of the image on a print order. That is, a system is generally used in which even if a client performs favorite image correction (processing), the image-processing parameter is adjusted at the print station side without considering the information on the client's image correction so that the finish quality original to the print station is realized.

SUMMARY OF THE INVENTION

The present invention is achieved in view of the above-described circumstances and its object is to mainly achieve the following aims (1) to (4).

(1) To provide the user software capable of automatically rearranging and classifying a lot of image data and easily finding out a desired image out the image data according to necessity by only recording (copying) the image data in a hard disk and reducing the time for the user to rearrange images.

(2) To reduce the time for processing an uploading image or uploading the image while considering the capacity of a server space and easily share an image between friends.

(3) To realize a system allowing the user to determine desired image-processing conditions (finish qualities such as slightly hard/slightly soft, sharp/mild, slightly bright/slightly dark, etc.) and order a print of an image.

(4) To reduce the cost of the printing service by getting a print from the nearest store (desired place).

It is also an object of the present invention to provide the total solution that any one can easily enjoy digital imaging.

To attain the above-described object, the present invention is directed to an image-printing system, comprising: a connection-managing server which enters a closed user group (CUG) in which a limited number of users share an image on a network, issues an authorization code necessary for login to the entered CUG while managing login/logout of user terminal units respectively having the authorization code to the CUG, and managing a peer-to-peer connection between the user terminal units on the network; and an order-accepting server which is peer-to-peer-connected with the user terminal units respectively having the authorization code via the network, gets image data relating to a print order from each of the user terminal units, sends the image data to a digital printer set in a print station, and makes the digital printer execute printing in accordance with the image data.

According to the present invention, at the time of sharing an image with another user on a network, a CUG is first entered in a connection-managing server. When the CUG is entered, an authorization code (password or authorization key) necessary for login to the CUG is issued by the connection-managing server.

By delivering the authorization code to at least one other user and thereby setting the authorization code to a plurality of user terminal units, the image can be shared between the user terminal units through peer-to-peer connection.

The connection-managing server manages login/logout to and from the CUG and grasps on-line user terminal units. The user terminal unit can confirm other connected user terminal unit by asking of the connection-managing server about the login status of the CUG. Image data is transferred between peer-to-peer-connected user terminal units, and it is possible to view or download images stored in other user terminal units or order prints of the images.

According to the present invention, since an order-accepting server is peer-to-peer-connected with user terminal units, it is possible for the order-accepting server to directly get image data from a user terminal unit in which the image data is stored. The order-accepting server which gets the image data from the user terminal unit sends the image data to a digital printer to make the digital printer print the image data. The print generated by the digital printer is provided for the user who is the orderer.

The present invention is thus constituted so that an image can be shared between restricted user terminal units respectively having an authorization code and a print can be gotten by transmitting the shared image to an order-accepting server through peer-to-peer connection, it is unnecessary to upload an image to be printed to a center server, and it is possible to easily order a print.

The print station includes various aspects such as a lab, a print shop, a kiosk terminal installed in a convenience store and the like, and printing facilities used in the home. The order-accepting server and the digital printer may be installed at the same place, or they may be installed at different places far from each other.

According to an aspect of the present invention, the connection-managing server receives an entry request for the CUG from the user terminal unit via the network, and enters the CUG and issues the authorization code in accordance with the request.

It is preferable that the image-printing system further comprises a user management server which includes a user-information memory storing information on an image-processing condition designated by each user, the user management server reading the information on an image-processing condition of a user who is a print orderer from the user-information memory to provide the information for the print station.

It is further preferable that the digital printer includes an image processor which processes an image in accordance with the information on the image-processing condition gotten from the user management server to generate a print image.

That is, it is preferable to use a configuration in which a user can select an image-processing condition influencing the finish quality of a print (such as slightly hard/slightly soft, sharp/mild, slightly bright/slightly dark, or the like) and store the information designated by each user in the memory (user information memory) of a user-managing server. Then, a print having a finish quality meeting the request of the user is provided by executing the image processing reflecting the image-processing condition of a user who is a print orderer under printing.

Not only when printing an image stored in the user terminal unit of a user who is a print orderer but also when the user requests a print of an image stored in other user terminal unit, it is possible to realize the finish quality designated by the print orderer.

Another aspect of the present invention is the image-printing system further comprising an order-managing server which receives a print order from each of the user terminal units via the network, issues an order ID every order, manages the information on a plurality of print stations, and provides information necessary for the peer-to-peer connection with the order-accepting server of one of the plurality of print stations selected by the user as a print-receiving place for the user terminal unit of the user ordering the print.

The order-managing server can control a plurality of print stations and simultaneously manage print orders sent from user terminal units. Moreover, the order-managing server can provide the information (location, store name, communicating destination, and price list of printing services) on the plurality of print stations managed by the server for user terminal units.

The user can designate a desired store (place preferable to receive a print) out of the plurality of print stations and request prints and receive prints at the nearest store (desired place). Thereby, the individual delivery cost such as postage is unnecessary, and it is possible to realize lower-price printing services.

According to still another aspect of the present invention, the order-accepting server includes a printing-completion-communicating device which communicates the order ID relating to completion of the printing relating to the order to the order-managing server when the print relating to the order is completed; and the order-managing server receives the order ID showing the completion of the printing from the printing-completion-communicating device and charges the printing service for the order ID.

Moreover, a user terminal unit used for the image-printing system of the present invention comprises: an image-getting device which gets image data from other peer-to-peer-connected user terminal unit; an image-displaying device which displays an image represented with the image data gotten by the image-getting device so that the image is viewed; an image memory which stores image data; and an order-inputting unit through which an order is inputted for selecting at least one image from images stored in the other user terminal unit and images stored in the image memory and requesting a print of the selected image.

Preferably, the user terminal unit further comprises a restriction-setting device which adds, when sharing images stored in the image memory in the CUG, a restriction to a using method of the images.

In this case, the restriction-setting device includes an aspect that the restriction-setting device sets, on the basis of an operation of an image owner, at last one of permission and inhibition of at least one of viewing of the image, downloading of the image data, ordering of a print using the image data, and writing of a comment on the image.

It is possible to constitute a user terminal unit according to the present invention by a computer. That is, it is possible to record a program which makes a computer function as the image-getting device, image-displaying device, image memory order-inputting operation device, or restriction-setting device in a CD-ROM, magnetic disk, or other recording medium and provide the program for a third party through the recording medium or provide the downloading service of the program through a communication line such as Internet.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

The preferred embodiment of the present invention will be described below in detail by referring to the accompanying drawings.

Basic Configuration of System

Figure 1:
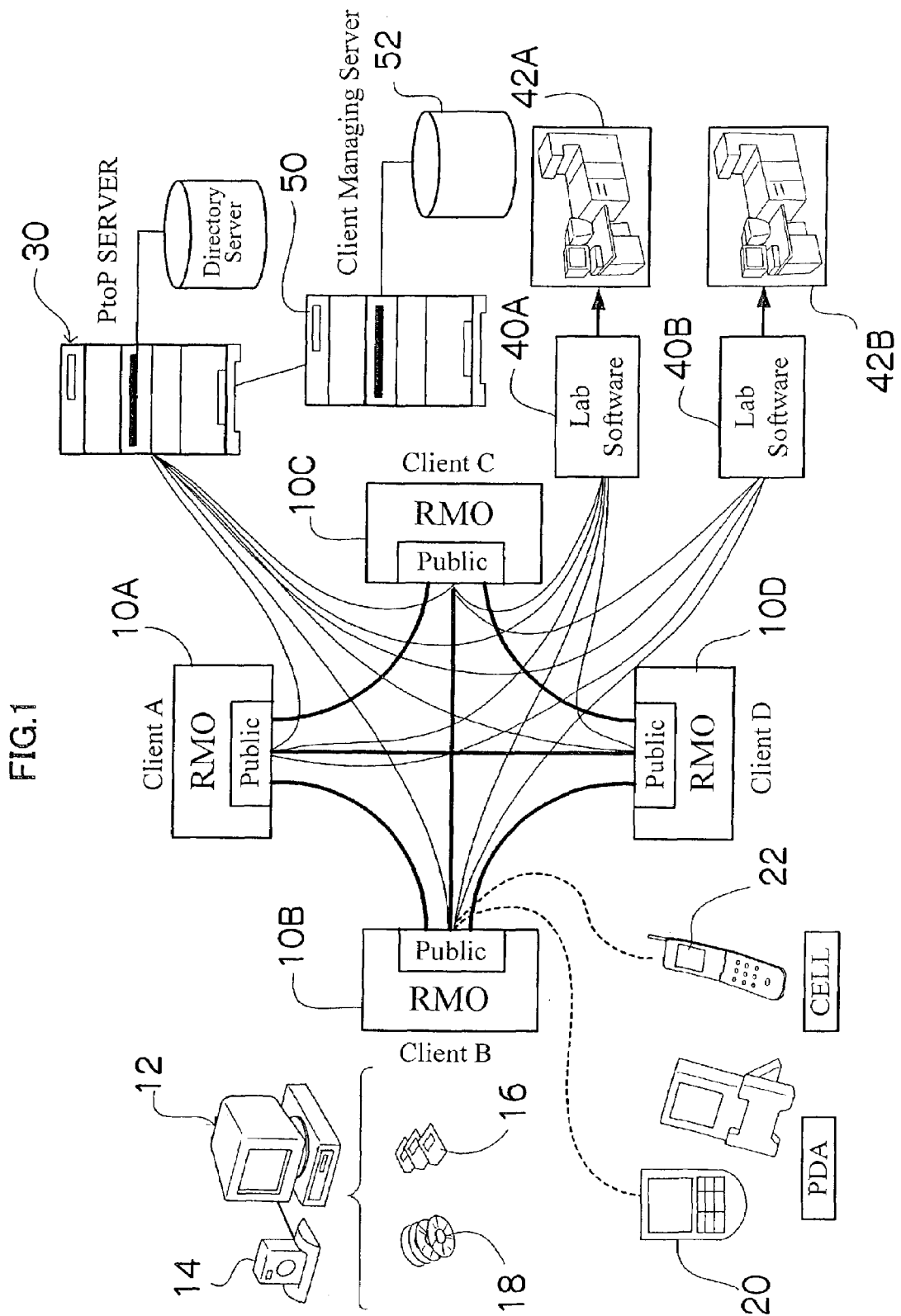
FIG. 1 is a basic block diagram of an image-sharing system according to an embodiment of the present invention.

FIG. 1 shows a block diagram of a system of an embodiment of the present invention. The system is a peer-to-peer network system that shares and prints an image and comprises the following three components (1) to (3).

(1) A first component includes client terminals (one type of peers) 10A, 10B, 10C, and 10D in which the client software referred to as rich media organizer (RMO) is built. Hereafter, these client terminals are respectively referred to as "RMO terminal". Though FIG. 1 shows four RMO terminals 10A to 10D corresponding to clients A to D, it is allowed to use one or more RMO terminals to form a system. Moreover, to share an image by a plurality of persons, it is necessary to use a plurality of RMO terminals.

Each of the RMO terminals 10A to 10D comprises, for example, a personal computer 12 and has a function which automatically classifies images in accordance with the information on the content of an image, the photographing date, or the photographing place at the time of storing images recorded by a digital camera 14 or the like in a hard disk. Each image group classified and rearranged almost corresponds to an event (incident or function). By effectively using the classifying information, the user can easily find a desired image out of the image groups in the hard disk and therefore, it is easy to reuse images. The expression "reuse" represents sharing of an image with a friend or ordering of prints.

To input an image in the hard disk of the personal computer 12 serving as the RMO terminals 10A to 10D, there are the following aspects: an aspect of connecting the digital camera 14 with the personal computer 12 through a digital communication interface such as a USB or the like and transmitting image data from the digital camera 14 to the personal computer 12, an aspect of capturing image data from a memory card 16 into the personal computer 12 by using a card reader (not shown), and an aspect of capturing image data from a recording medium such as a CD-R 18 or the like.

It is possible to use the RMO terminals 10A to 10D not only for the personal computer 12 but also for information-communicating devices such as a mobile information terminal (PDA) 20 and mobile telephone 22. That is, by setting an RMO in the PDA 20 and mobile telephone 22, it is possible to use these information-communicating devices as the RMO terminals 10A to 10D.

(2) A second component is a peer-to-peer directory server (hereafter referred to as PtoP server) 30. The PtoP server 30 is a server which manages the RMO terminals 10A to 10D of a client (user) and issues a password for defining a Closed User Group (CUG), controls the connection between the RMO terminals 10A to 10D respectively having a password, and manages the login status to a CUG.

(3) A third component includes order-accepting servers (one type of peers) of print stations or labs (printing-service-providing places). FIG. 1 shows two order-accepting servers (hereafter respectively referred to as lab server) 40A and 40B corresponding to two different labs. However, it is allowed to use one or more lab servers to form the system.

The lab servers 40A and 40B respectively accept a print order from a client via a network. When the lab servers 40A and 40B are peer-to-peer-connected with the RMO terminals 10A to 10D, they receive image data and order information from the RMO terminals 10A to 10D and operate digital printers 42A and 42B in accordance with the image data and order information. Thus, a print corresponding to the order of a client is generated and provided for the client. The corresponding lab server and digital printer may be installed at the same place, or they may be installed at different places far from each other.

Moreover, the system shown in FIG. 1 is provided with a client-managing server 50, which manages client information in addition to the above-described basic components (1) to (3). The client-managing server 50 is a server for managing the information on clients who use this system and has a memory 52 storing client information. The memory 52 stores a database that includes the information on the finish quality of a print designated by each user (information on image-processing conditions) together with the personal information of the user (user ID, name, address, communicating destination, etc.).

The lab servers 40A and 40B respectively get the information on a print orderer from the client-managing server 50 according to necessity and provide a print having the finish quality desired by the user. Moreover, it is allowed to set one client-managing server 50 to a plurality of labs or to each lab store.

Operations of RMO Terminal (Client Application Portion)

Then, functions of the RMO terminals 10A to 10D are described in detail. Though the RMO terminal 10A is hereafter described, the same is applied to the other RMO terminals 10B to 10D.

The application software "RMO" included in the RMO terminal 10A is image-managing software, which unites an image-managing (rearranging, viewing, and sharing) function and an image-processing (working and editing) function.

Figure 2:
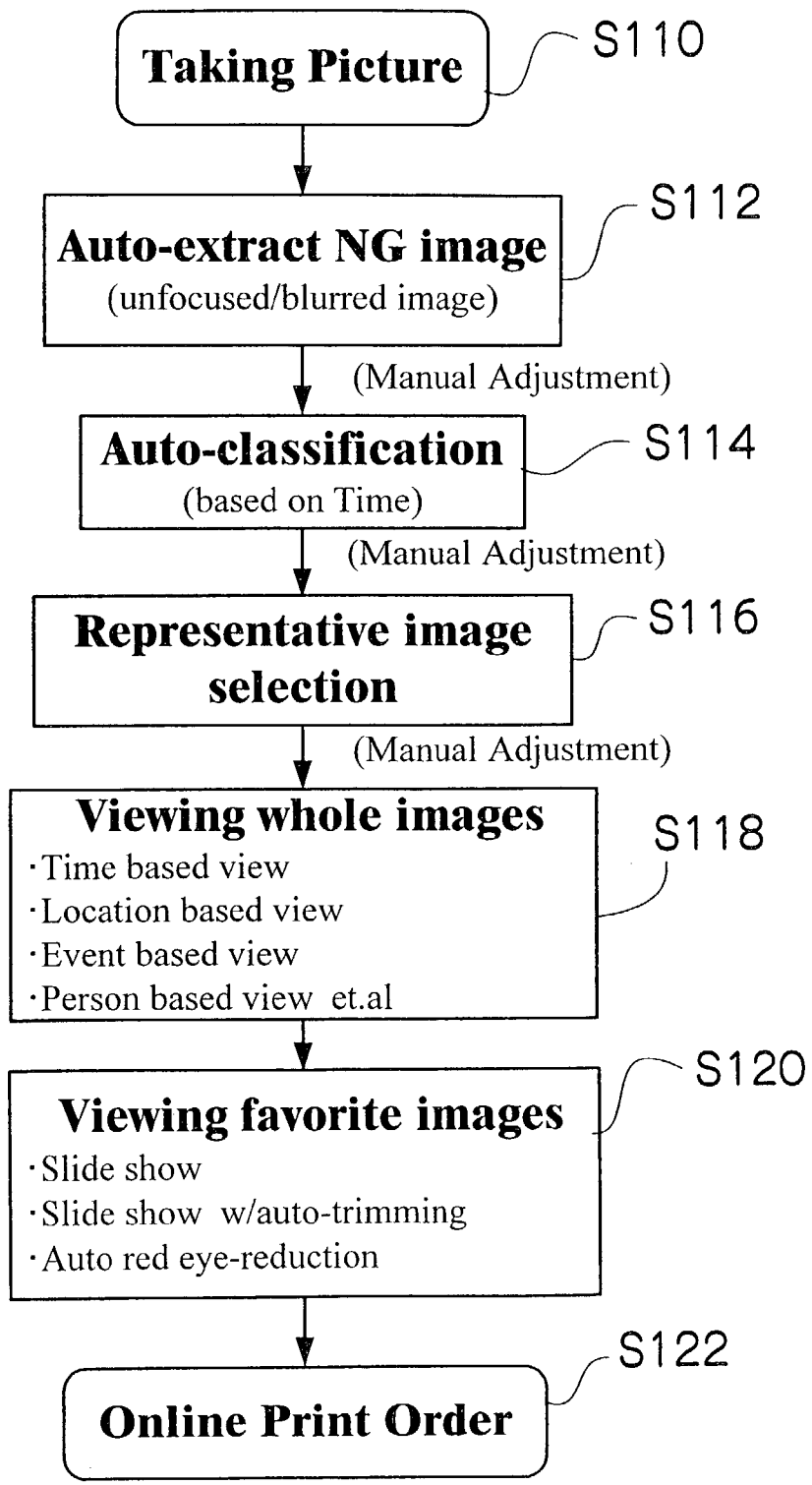
FIG. 2 is a flowchart showing a flow of operations relating to an image-managing function of an RMO.

FIG. 2 shows a flow of operations relating to the image-managing function of the RMO terminal 10A. An image is recorded by the digital camera 14 and then, the image is captured into the RMO terminal 10A (step S110). To input an image, as described above it is also allowed to connect the digital camera 14 with the RMO terminal 10A by a communication cable or use a removable recording medium such as the memory card 16.

When an image is inputted to the RMO terminal 10A, the RMO terminal 10A analyzes the captured image and automatically extracts probable NG images such as an unfocused image and blurred image (step S112). For example, the high-frequency component of the image signal is detected, and an image almost free from a high-frequency component is determined as an unfocused image.

The extracted probable NG images are displayed on the monitor (display) of the RMO terminal 10A and it is prompted for the user to confirm it. At this point of time, the user determines whether the automatically-extracted probable NG images are necessary and performs the operation for excluding necessary images from the probable NG images while performing the operation for approving the cancel of unnecessary images.

The data on images that are allowed to cancel as NG images is deleted from the memory (RAM) or hard disk of the RMO terminal 10A. It is allowed to extract or delete NG images after temporarily capturing the image data into the hard disk or on the RAM when inputting the image data to the hard disk.

Then, remaining images (not-deleted images) are automatically classified (step S114). For example, they are classified in accordance with the photographing dates of images. Serial file numbers are automatically provided for files of images recorded by the digital camera 14 in order of recording and the information showing the photographing dates (dates and hours) of images are recorded as additional information. For example, in the case of an image file generated in accordance with an Exif (Exchangeable Image File Format), a file name "DSCF**.JPG" ("**" denotes a file number constituted by a string of 4-digit numerals) is automatically generated and the information on a photographing date is recorded in the tag of the Exif.

The central processing unit (CPU) of the RMO terminal 10A can get the photographing date of an image by reading the additional information recorded in each image file. Moreover, it is possible to get a photographing date by using a time stamp automatically recorded when an image file is generated.

At the time of photographing many images by the digital camera 14 ever several images, it is generally possible to classify the images into several image groups every relevant images. For example, it is possible to classify the images every event such as "photos of soccer", "photos of travel" and "photos of party". Relevant images are frequently recorded intensively on a comparatively-short period, but an image recorded after several days pass has a low relation with an image recorded last time.

Therefore, the RMO terminal 10A estimates the relation between images in accordance with the recording interval between images recorded in time series and determines the portion between images having a comparatively long interval from the last image as the boundary of groups.

The aspect of classifying (folder-dividing) automatically generated is displayed on the monitor of the RMO terminal 10A and it is prompted for the user to confirm it. At this point of time, the user determines whether the automatically-generated classifying aspect is acceptable, corrects the classifying according to necessity, and performs an operation for approving the classifying when the aspect is acceptable.

When the classifying is approved, the RMO terminal 10A performs the processing for automatically selecting a representative image in each group (step S116). This embodiment uses a method of analyzing images in the group, recognizing the face of a person, and extracting the image in which the largest face area is photographed nearby the center of the image in the group as the representative image.

An automatically-extracted representative image in each group is displayed on the monitor of the RMO terminal 10A and it is prompted for the user to confirm it. In this case, the user determines whether an automatically-generated representative image is acceptable. When the image is acceptable, the user performs the operation for approval but when the image is not acceptable, the user can perform the correcting operation for selecting another image out of the same group as a representative image. Thus, a representative image is selected in every group.

Images captured by the RMO terminal 10A is folder-divided in accordance with the above-described classifying and stored in the hard disk of the RMO terminal 10A (added to the database). Moreover, the selection information on the representative image selected for each folder is recorded by being related to the folder. Thereafter, it is possible to view images in the hard disk.

When many folders every event are stored in the hard disk, it is difficult to get the content of a certain folder by only the folder name. Therefore, by relating one picture (representative image) symbolizing the event to the folder name instead of changing folder names (inputting characters), it is possible to easily get the content of the folder and omit operations including character input. To view objects in the hard disk, it is preferable to display a representative image by pasting the representative image to the icon of each folder. The representative images thus serve as an index of the folders.

To view whole images, a large number of images stored in the hard disk are purposed (step S118). In this case, view styles include the time-based view, location-based view, event-based view, and person-based view and the user can selectively change these view styles properly.

Figure 3:
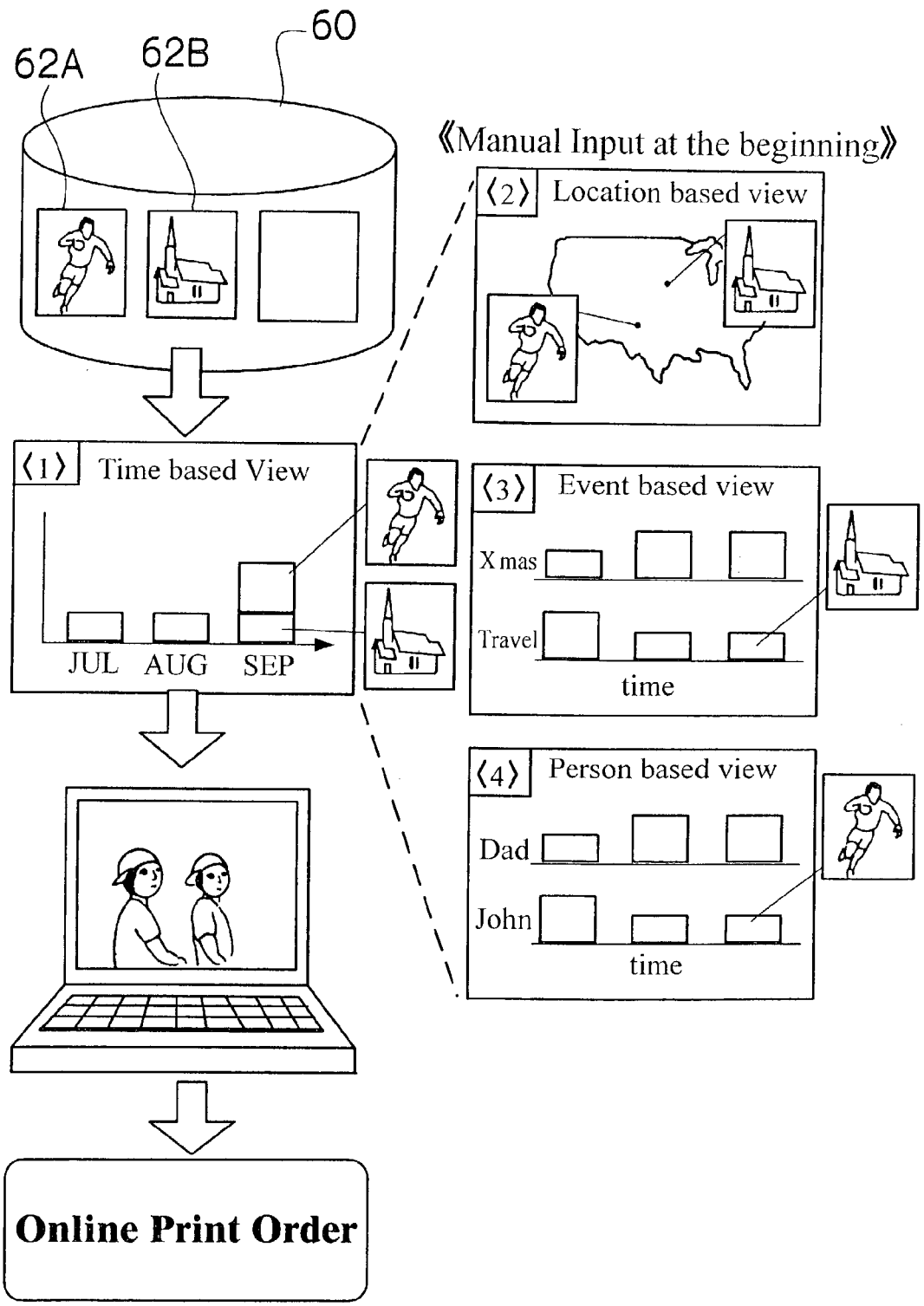
FIG. 3 is an illustration showing a view screen at the time of viewing an image at an RMO terminal.

FIG. 3 shows view screens when viewing images. As described above, images are stored in the hard disk 60 while they are rearranged for folders 62A, 62B, . . . and the representative image is selected for each of the folders 62A, 62B, . . . To view whole images in the hard disk 60, by selecting the time-based view for example, a histogram assigning years and months to the horizontal axis as shown by a section <1> in FIG. 3. The histogram has a displaying configuration in which blocks having sizes reflecting the numbers of images of the classified folders 62A, 62B, . . . are arranged every photographing month and graphed so that the relation between photographing month (time) and invents can be understood at a glance.

According to the section <1> in FIG. 3, it is possible to understand that there is one event of 30 sheets in July, there is one event of 32 sheets in August, and there are two events in September in which one (folder 62A) of the events has 80 sheets and the other (62B) has 26 sheets.

It is allowed to superimpose a representative image over a block corresponding to an event (folder) or it is allowed that a representative image is pop-up-displayed when a mouse pointer overlaps (when pointing with a pointing device).

A display example of the location-based view is shown at a section <2> in FIG. 3. In the case of the location-based view, a photographing place corresponding to an event is displayed on a map and a representative image corresponding to each event (folder) is related to the photographing place and displayed.

A display example of the event-based view is shown at a section <3> in FIG. 3. By adding event information to the folders in the text format, it is possible to classify the folders based on the keyword of the event information. In the case of the section <3> in FIG. 3, the folders classified by keywords "Xmas" and "Travel" are displayed as a histogram by assigning time to the horizontal axis.

A display of a person-based view is shown at a section <4> in FIG. 3. By adding the information on persons to the folders in the text format, it is possible to classify the folders in accordance with the keyword of personal information. According to the section <4> in FIG. 3, the folders classified by keywords "Dad" and "John" are displayed as a histogram by assigning time to the horizontal axis.

It is possible to scan the whole of each folder in accordance with the view styles illustrated by the sections <1> to <4> in FIG. 3. When selecting a desired folder, images in the folder are displayed as thumbnails in a list. When clicking a desired thumbnail, the image is independently displayed (only one sheet is displayed).

It is possible for the user to select a desired folder or select one or a plurality of favorite images (step S120 in FIG. 2) through the above-described whole viewing. Thus, it is possible to store selected desired images in the folders for the different purposes (favorite image folder, opening public folder, etc.).

Folders for the different purposes include a folder for ordering prints of the images, a folder for sharing the images via a peer-to-peer network described below, and a folder for automatically reproducing the images by slideshow software. For the folders for the purposes, it is allowed to physically prepare a copy of an image file or use logically-virtual folders.

The RMO of this embodiment is provided with a slideshow function for continuously reproducing a plurality of images automatically, a slideshow function provided with automatic trimming function or not, and a function for automatically correcting a red-eye image of a flash photo and the user can selectively use these functions. The automatic trimming function is a function for trimming the image by automatically enlarging and displaying the face of an object person detected through image analysis. The technique for recognizing a face can be also used for the representative-image-selecting technique described above.

Moreover, for an image group in which a folder for ordering prints is stored in step S120, it is possible to request prints in accordance with an on-line print order (step S122).

The functions (automatic NG-image-extracting function and automatic representative-image-selecting function) described in steps S112 and S116 in FIG. 2 can be located as optional functions of an RMO and an aspect for omitting at least one of these functions is possible.

Moreover, as other optional function, it is preferable to add the information capable of determining that a group of continuous images having a very high correlation is constituted by a series of continuous photos (corresponding to a case of taking pictures in a continuous photographing aspect, a case of photographing the same object several times in order to avoid a photographing error, or a case of taking pictures in accordance with an auto bracketing function) and identifying the set photographing to an image file as metadata in the automatic classifying function described for step S114.

The information on the above-described set of images is used for the viewing step in step S120 for example. That is, to display a series of images (set of images) photographed in the continuous photographing aspect or the like in the whole view, the display space becomes waste when similar images are continuously displayed. To make it possible to simultaneously view many images by effectively using the limited display space of a monitor, only the head image of a set of images is displayed to add a special display for graphically hinting the state in which other similar images are overlapped backward. To see a series of images individually, by clicking the representative image, the overlapped images are developed in time series and displayed as a list.

As still other optional function, each of classified groups is recognized according to the text when the automatic representative-image-selecting function described for step S116 is not used. There is a method for the user to manually input the text of "Christmas", "Paris travel", etc. However, when there is no manual input, a "photographing date" is used instead by referring to the time stamp of a file included in the group.

That is, when the representative-image-selecting function is not used, a folder is recognized in accordance with the photographing date. Thereby, it is possible to automate folder rearrangement. It is naturally possible to form the photographing date according to a time stamp into a text in the default, and then for the user to change the text by inputting characters of such as "Christmas".

Then, the image-processing function of the RMO will be described below.

Figure 4:
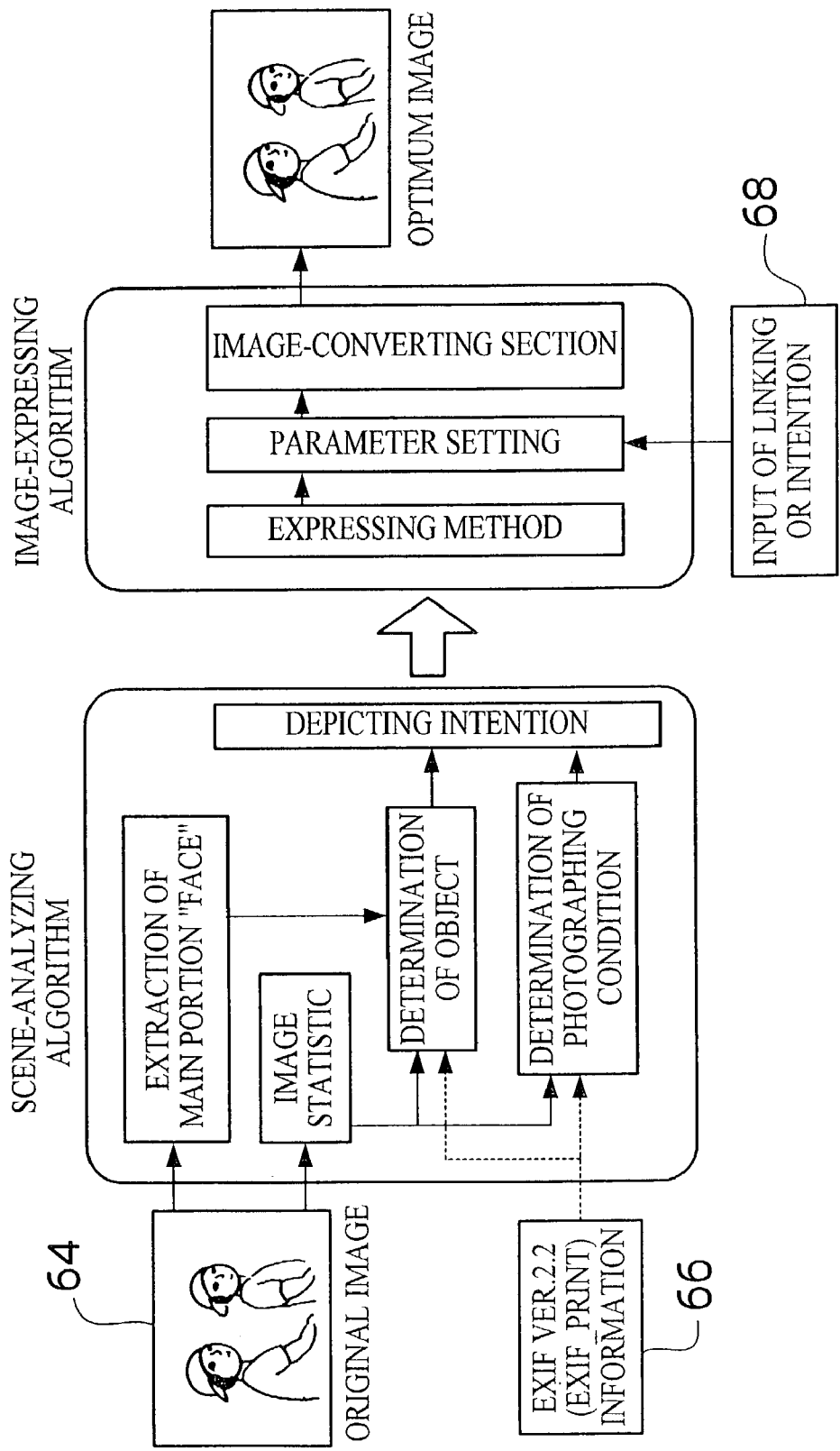
FIG. 4 is a conceptual view showing a processing flow of an image-processing algorithm of an RMO.

FIG. 4 shows a basic operation flow for image processing. An image-processing algorithm same as that of a lab is set in the RMO. For an inputted image (original image) 64, main portions are detected and various image statistics are calculated mainly about a person by analyzing the image data, and the object is automatically analyzed to estimate a depicting intention by further analyzing various pieces of photographing information (photographing light source, lighting directions of backlight/normal light, and light exposure) gotten from the tag information 66 added by the digital camera 14.

In accordance with the estimated depicting intention, gradation and color balance are automatically adjusted and dynamic range compression and granular suppression sharpness enhancement are performed to determine an optimum image quality.

The above-described image processing has a very high-productivity and is an advanced image-processing technique at the same level as the processing executed under printing at a lab, and a conventional lab printing system did not include a mechanism capable of reflecting client's direct depicting-intention or taste. That is, there is a client who likes an image having a hard gradation and a clear impression and another client who wants to express a soft gradation and changes from a clear portion up to a dark portion; however, since a conventional lab system performs printing in accordance with the greatest-common-divisor setting, it is impossible to sufficiently reflect clear depicting intentions or tastes of clients on prints.

Therefore, the RMO of this embodiment has a function in which the user can individually set image-processing parameters and means that accepts an input of a taste or depicting intention about the finish quality of a print. That is, the image-processing function included in the RMO of this embodiment allows the user to input (parameter-edit) the information 68 on the taste and intention of a client before deciding a final image-processing parameter.

For example, there are the following methods (A) to (C) (it is naturally possible to combine these methods).

(A) Several levels of options for parameters are prepared for each of gradation, sharpness, and dynamic-range compression, etc. (in the case of gradation, several levels of options from "hard" to "soft") and when the client selects a desired option by operating an inputting device such as a keyboard and a mouse, the change (image-processing result) appears on the monitor screen. The client can visually confirm whether the option matches his taste.

(B) In the case of a composition in which a plurality of persons are photographed, the client designates one of the persons in whom the client has the most interest. Thus, an image-processing section automatically finishes the skin color of the person into the most preferable skin color. The user can visually confirm whether the expression according to his intention is gotten on the monitor similar to (A).

(C) In the case of an image in which a red-eye phenomenon occurs through flash photographing, an automatic red-eye-removing function is designated.

The conditions (favorite information designated by the client) described in the above-described (A) to (C) are also conveyed to and managed by the client-managing server 50 when a print is ordered.

In particular, the designation condition in the above-described (A) for reflecting the taste of a client can be set for each photographing classification such as person photographing, scene photographing, indoor photographing, and proximity still-life photographing.

It is preferable that the taste of a client can be set for each object (image or screen) so that, for example, the photo of a flower becomes soft and the photo of a child becomes hard. A configuration is formed in which the user can set his taste for each scene classification to be automatically identified by using a technique for automatically discriminating between objects (scenes) in accordance with image analysis. In this case, favorite information of the client is managed as matrix information for each scene classification.

Thus, when the user edits an image on the RMO terminal and inputs favorite information, the setting thereafter becomes default in the client software. When the user gives a print order to a lab after setting the favorite information, the favorite data is also conveyed to the lab and the lab can automatically prepare a print having an optimum finish quality for each client. It is enough for the lab to classify scenes through an image analysis and perform the processing of reflecting predetermined favorite data and therefore, it is possible to reduce the cost of the printing service since automatic processing is possible.

Moreover, at the time of requesting prints through a route other than on-line such as a case of directly bringing the data in the digital camera 14 to a store not only case of ordering a print from the RMO terminal 10A on-line, it is possible to extract the favorite information of the user from the client-managing server 50 and provide a print having a desired finish quality by inputting client's information (e.g., user's name and mail address) to an order-accepting terminal in the store.

Operations of PtoP Server

Then, a CUG-sharing function will be described below.

Figure 5:
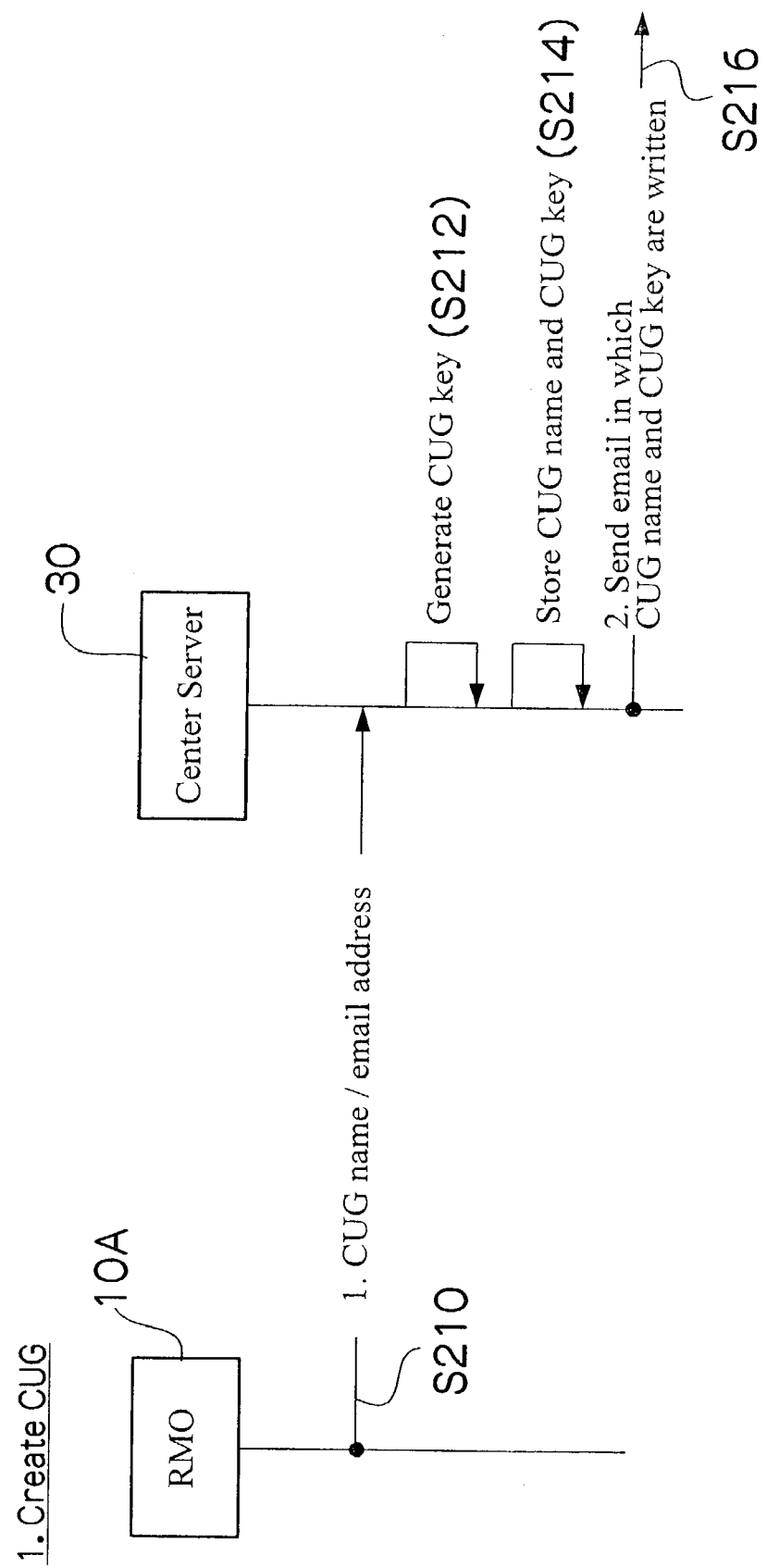
FIG. 5 is a sequence diagram showing a flow for issuing a CUG password.

The PtoP server 30 issues a password of a CUG in accordance with a request from any RMO terminal (e.g., RMO terminal 10A). FIG. 5 shows a flow of CUG password issue. The user desiring image sharing transmits a request for issuing a CUG password to the PtoP server 30 from the RMO terminal 10A (step S210). In the case of the above-described request, the user sends a CUG name (CUGs can be freely named by the user) and his e-mail address to the PtoP server 30 from the RMO terminal 10A.

The PtoP server 30 generates a CUG key (password) in accordance with the request from the RMO terminal 10A (step S212) and stores the CUG name and the CUG key by relating the name with the key (step S214). Then, an e-mail in which the CUG name and the CUG key are described is transmitted to the e-mail address of the requester (step S216).

Thus, the client who gets the password transmits the password to a desired person (e.g., travel friend, fellow student, family member, or relative) who wants sharing by using the e-mail or the like. By entering the password in RMOs, it is possible to create RMO users having the same password.

At the time of starting the RMO, the RMO communicates a user ID showing that it is an RMO user and the owned CUG password to the PtoP server 30. The PtoP server 30 retrieves RMO terminals having the same password and returns addresses of the terminals. As a result, the RMOs having the same password are peer-to-peer-connected and moreover they can share each other image data in a folder to which a password is added.

Moreover, the RMO allows a plurality of CUGs to set. For example, it is allowed to prepare AAAAA for a travel friend, BBBBB for a fellow student, and CCCCC for a family member or relative and enter these three passwords in the RMO of the client. An image in a folder defined as AAAAA is disclosed only for an RMO user having the password AAAAA.

Figure 6:
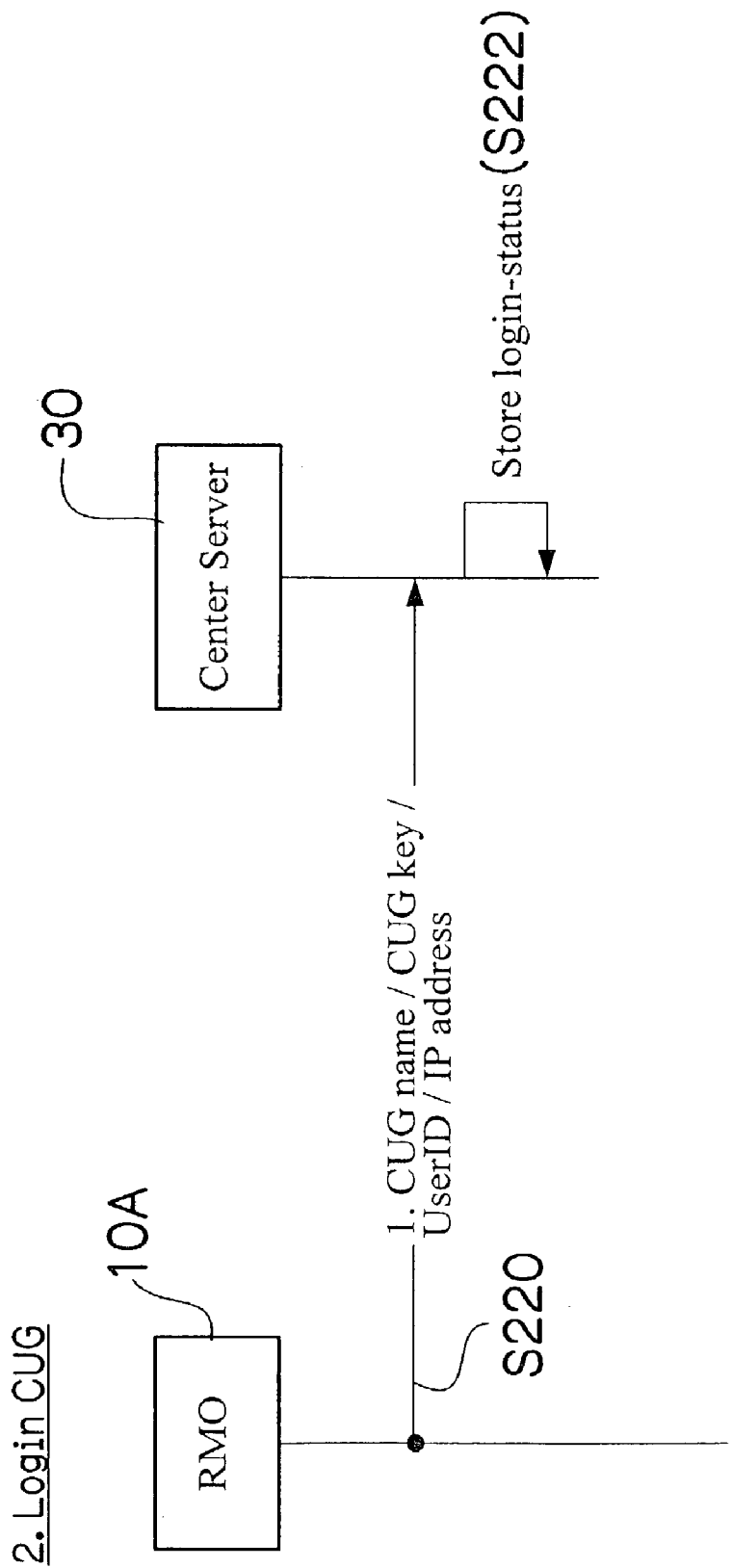
FIG. 6 is a sequence diagram showing a flow for logging-in to a CUG.

FIG. 6 shows a login sequence to a CUG. An RMO terminal (e.g., RMO terminal 10A) transmits a CUG name, a CUG password, a user ID showing an RMO user and the IP address of its own to the PtoP server 30 together with a login request command (step S220). The PtoP server 30 performs user approval in accordance with received data and stores a login status (step S222).

Figure 7:
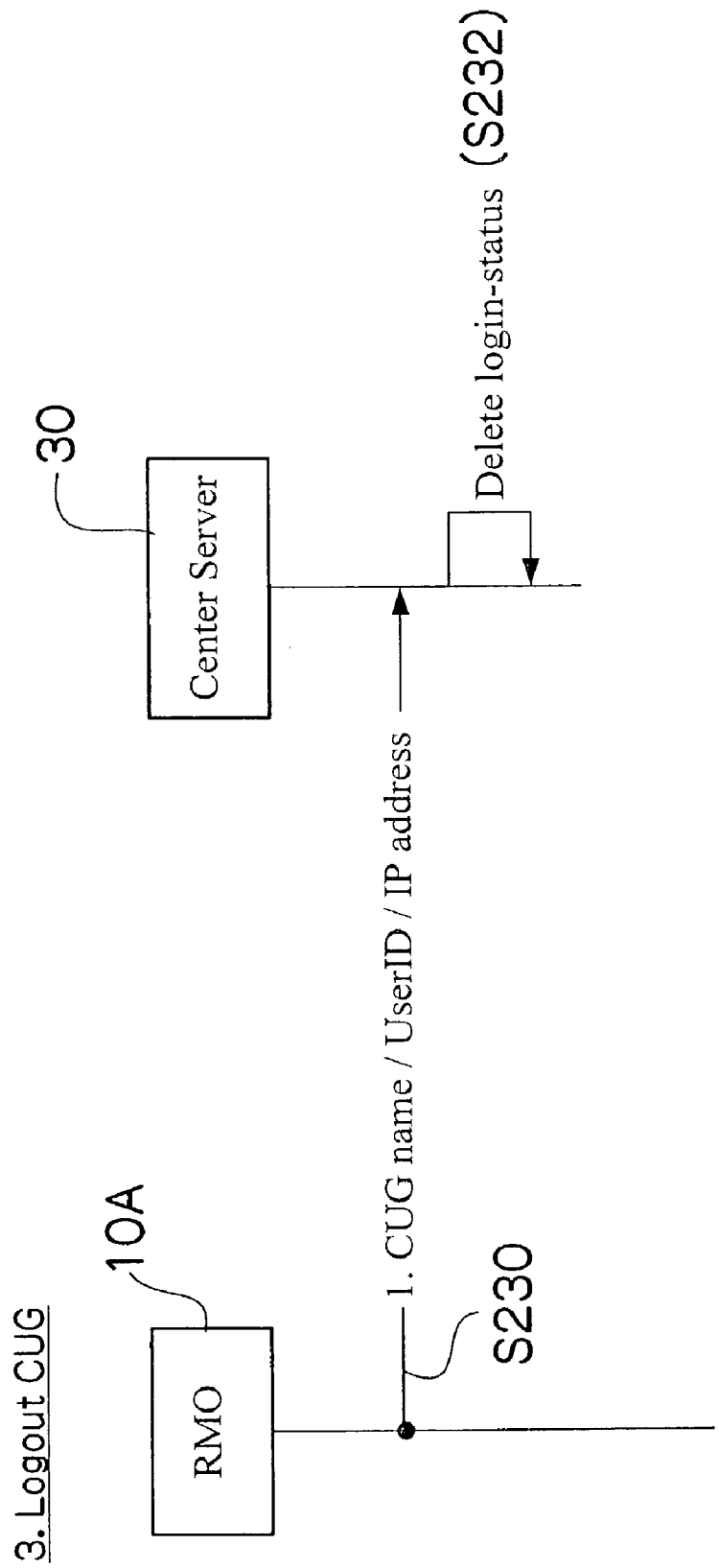
FIG. 7 is a sequence diagram showing a flow for logging-out from a CUG.

FIG. 7 shows a logout sequence from a CUG. An RMO terminal (e.g., RMO terminal 10A) transmits the CUG name, the user ID, and the IP address of its own to the PtoP server 30 together with a logout request command (step S230). The PtoP server 30 receives them to delete the login status (step S232).

Figure 8:
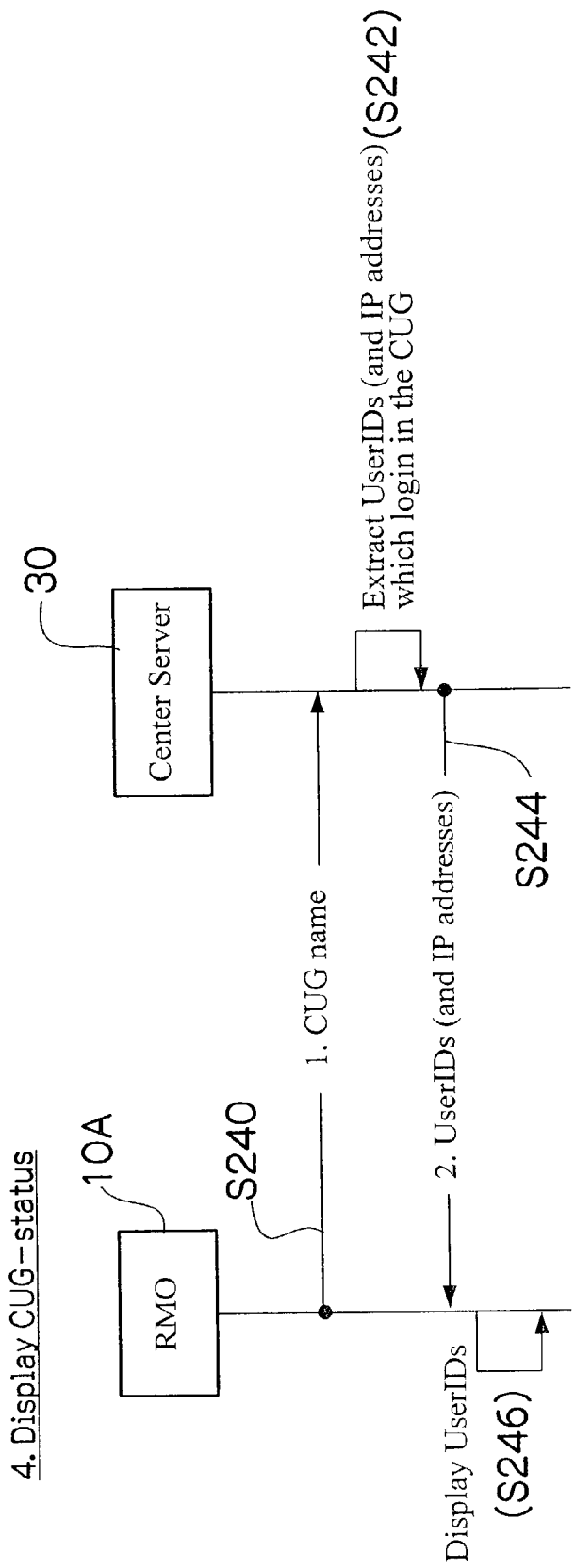
FIG. 8 is a sequence diagram showing a flow for displaying a CUG status.

FIG. 8 shows a sequence for getting the information on the user logging in to a CUG. To get the user information logging in to the CUG, a user-information request command is transmitted from an RMO terminal (e.g., RMO terminal 10A) to the PtoP server 30 together with the CUG name (step S240). The PtoP server 30 extracts the user ID of the RMO logging in to the CUG corresponding to the request and the IP address according to necessity (step S242) and returns these pieces of information to the RMO terminal 10A (step S244).

In the RMO terminal 10A that gets the user information on login, the user information on login (user ID, user name, and IP address) is displayed on the screen of the monitor in accordance with the gotten information (step S246).

Thus, the RMO terminals having the same password are peer-to-peer-connected each other and image data can be shared. For example, only thumbnail images are gotten out of a folder shared by all RMO users having the same CUG key (for example, a folder having the name of "public") and displayed on the screen of the monitor.

Then, to download a desired image out of the thumbnail list (to record the image in the hard disk drive of one's own), image data is transferred between peer-to-peer-connected RMO terminals to get the data.

In this case, the metadata accompanying the image (owner information of image and image-related information such as time, place, person, and event) is simultaneously gotten and stored in the database of one's own according to necessity. Because time information and GPS information are universal, these pieces of information are directly added to the event-based image database of one's own. Other metadata is stored as metadata of the owner together with owner information. It is possible to correct the subsidiary information of one's own or use the information for other purpose.

Then, the CUG-sharing function and other optional functions will be described below.

There is also an aspect for adding the following optional functions (A) and (B) in addition to the above-described basic functions.

Option (A): It is possible to provide restrictions when disclosing an image in a CUG. That is, it is possible to define various restrictions such as permitting only viewing (only reading) through a monitor, permitting downloading, permitting ordering of prints by using the data, and permitting writing of a comment for the image.

In particular, the function for writing the information on a comment or the like represents that an image database in the hard disk of one's own is gradually enriched unconsciously each other in accordance with the efforts by familiar fellows.

Option (B): The number of CUGs is restricted to one (or a predetermined number of CUGs) at the beginning and when a client desires, the PtoP server 30 provides a key for lifting the restriction of the number of CUGs at a predetermined compensation. To realize the option (B) function, the client enters a user name and e-mail address in the client-managing server 50 when first starting an RMO. By providing the key via the server, it is possible to manage the number of CUGs in which each user can participate. Moreover, it is possible to distribute lifting keys respectively provided with a time limit or distribute the information for prompting continuation in the proximity of the time limit by e-mails.

Figure 9:
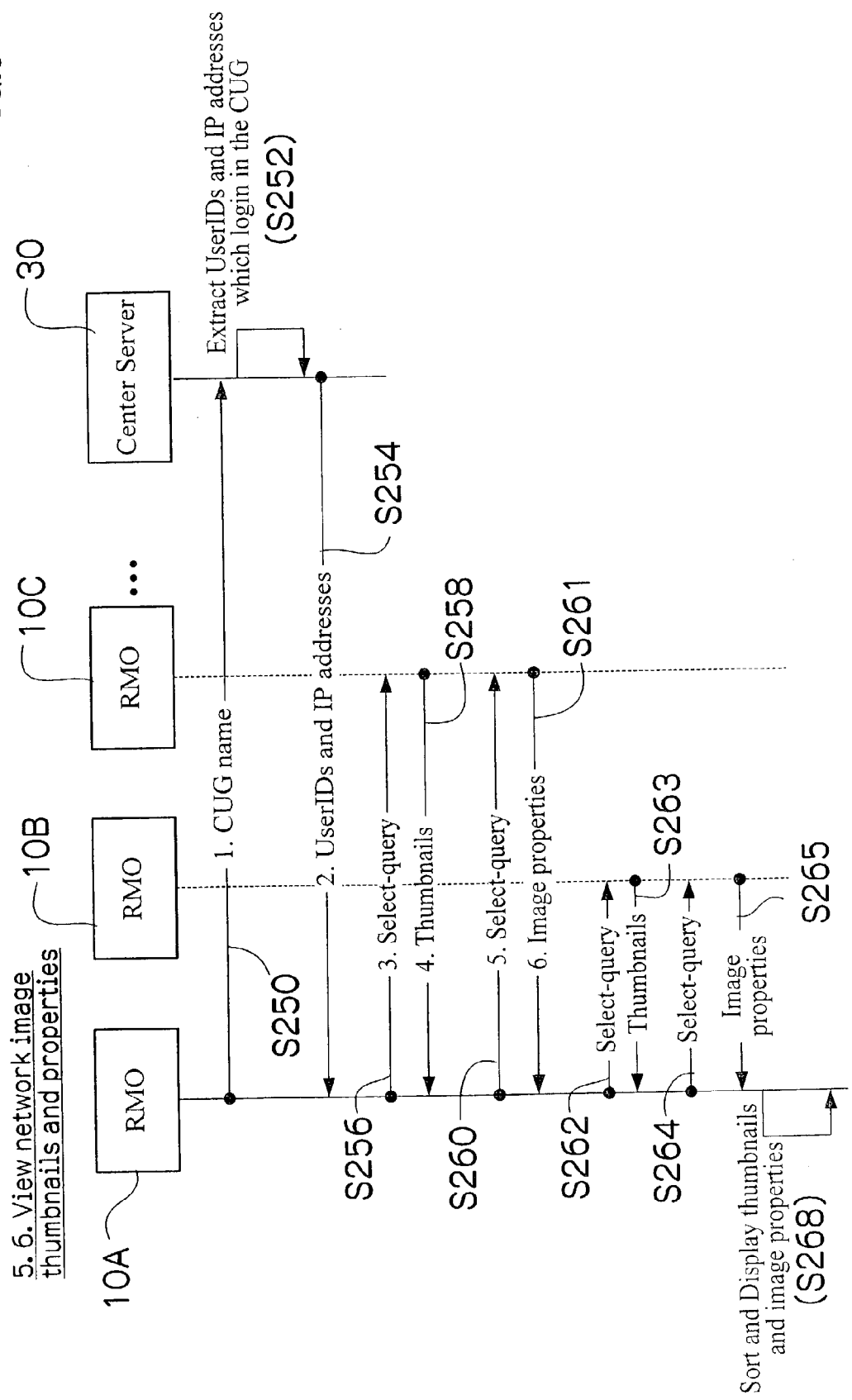
FIG. 9 is a sequence diagram showing a flow for sharing a thumbnail image and subsidiary information on the image between RMOs in a CUG.

FIG. 9 shows a sequence for sharing a thumbnail images and subsidiary information on the image.

In FIG. 9, description is made by assuming that the RMO terminal 10A gets thumbnail information and subsidiary information on images from other RMO terminals 10B, 10C, . . . First, the RMO terminal 10A transmits a CUG name to the PtoP server 30 together with a login-user-information request command in order to get the user information logging in to a CUG (step S250). The PtoP server 30 extracts the user ID and IP address of the user logging in to the designated CUG from the RMO terminal 10A (step S252) and returns the information to the RMO terminal 10A (step S254).

The RMO terminal 10A issues a query for requesting transmission of a thumbnail image by using the user information gotten from the PtoP server 30 and thereby peer-to-peer-connecting with a desired RMO terminal (e.g., 10C) (step S256). The RMO terminal (e.g., 10C) provides the data for the thumbnail image out of a shared folder to the RMO terminal 10A of the requester in response to the query (step S258).

Also in the case of the subsidiary information on images, a query is transmitted to an RMO terminal that stores data (e.g., 10C) from the request-side RMO terminal 10A (step S260) and in response to this query, the subsidiary information on images is returned to the requester-side RMO terminal 10A from the providing-side RMO terminal (e.g., 10C) (step S261).

Moreover, the RMO terminal 10A that is the requester can issue a query for requesting the transmission of a thumbnail image and the subsidiary information on images by peer-to-peer-connecting with another RMO terminal (e.g., 10B) (step S262 and step S264). The RMO terminal 10B provides the data for the thumbnail image and the subsidiary information on the image out of a shared folder for the RMO terminal 10A that is a requester (step S263 and step S265).

The subsidiary information on images includes such pieces of information as a file name, filing date, file size, file format, printing approval data, record (download) approval data, comment-writing-in approval data, time tag, person tag, position tag, event tag, comment, and original owner. The requester can simultaneously or selectively get these pieces of information.

Thus, the RMO terminal 10A can get the thumbnail image and the subsidiary information on the image from other RMO terminals 10B, 10C, . . . in a CUG and the gotten thumbnail image and the subsidiary information on the image are sorted in accordance with a predetermined criterion and displayed on a monitor (step S268).

Figure 10:
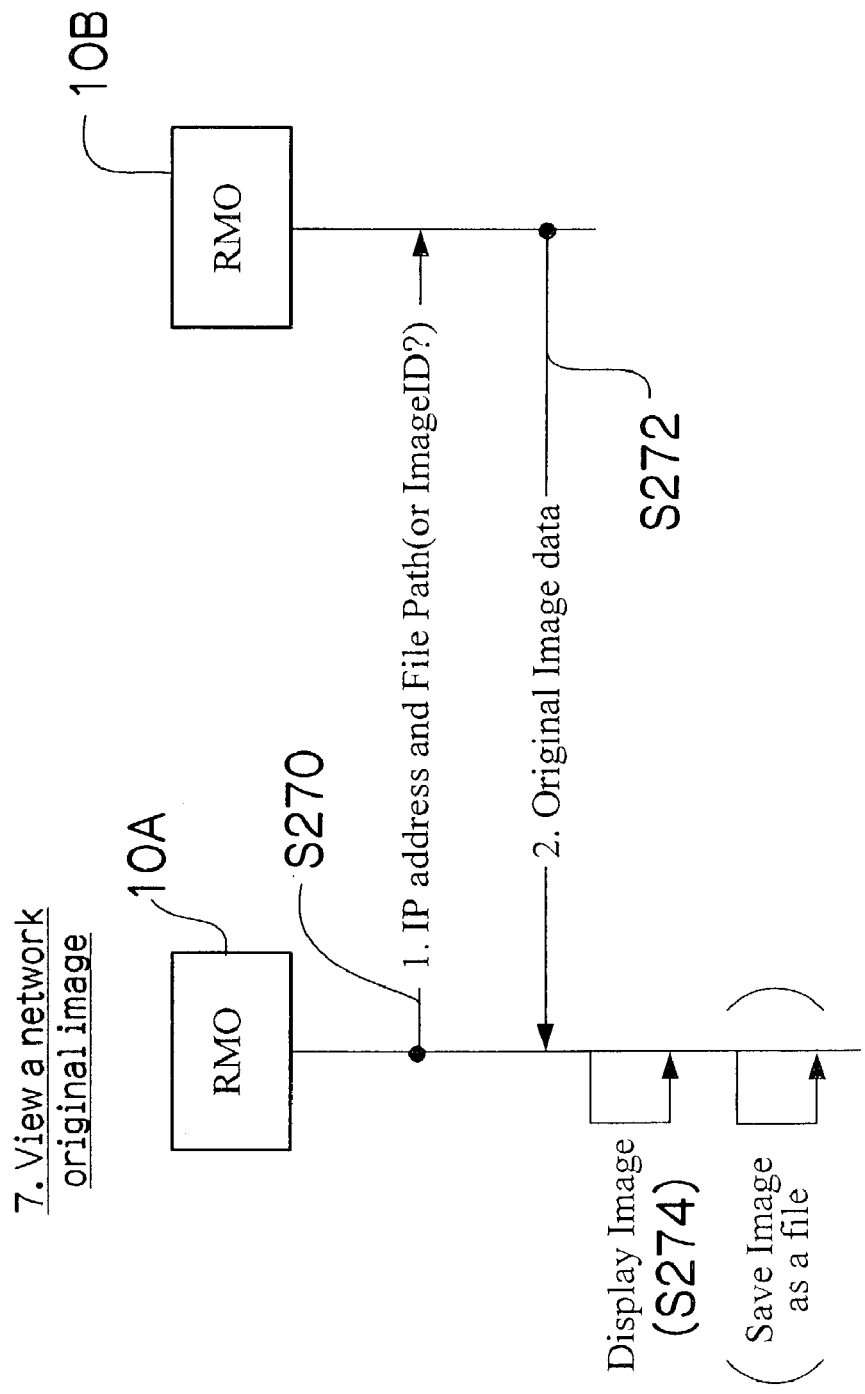
FIG. 10 is a sequence diagram showing a flow for getting original images between RMOs in a CUG.

FIG. 10 shows a sequence for getting an original image (main image) between RMOs in a CUG. When the RMO terminal 10A gets an original image from another RMO terminal 10B, the RMO terminal 10A transmits an image request command, IP address, and file path (image ID instead of or together with the file path) to the other RMO terminal 10B (step S270). The provider-side RMO terminal 10B transmits original-image data to the RMO 10A that is a requester in response to the request (step S272).

The RMO terminal 10A displays the received original-image data on a monitor (step S274). It is also allowed to store the original image in a hard disk or the like as a new file instead of or together with image display.

Figure 11:
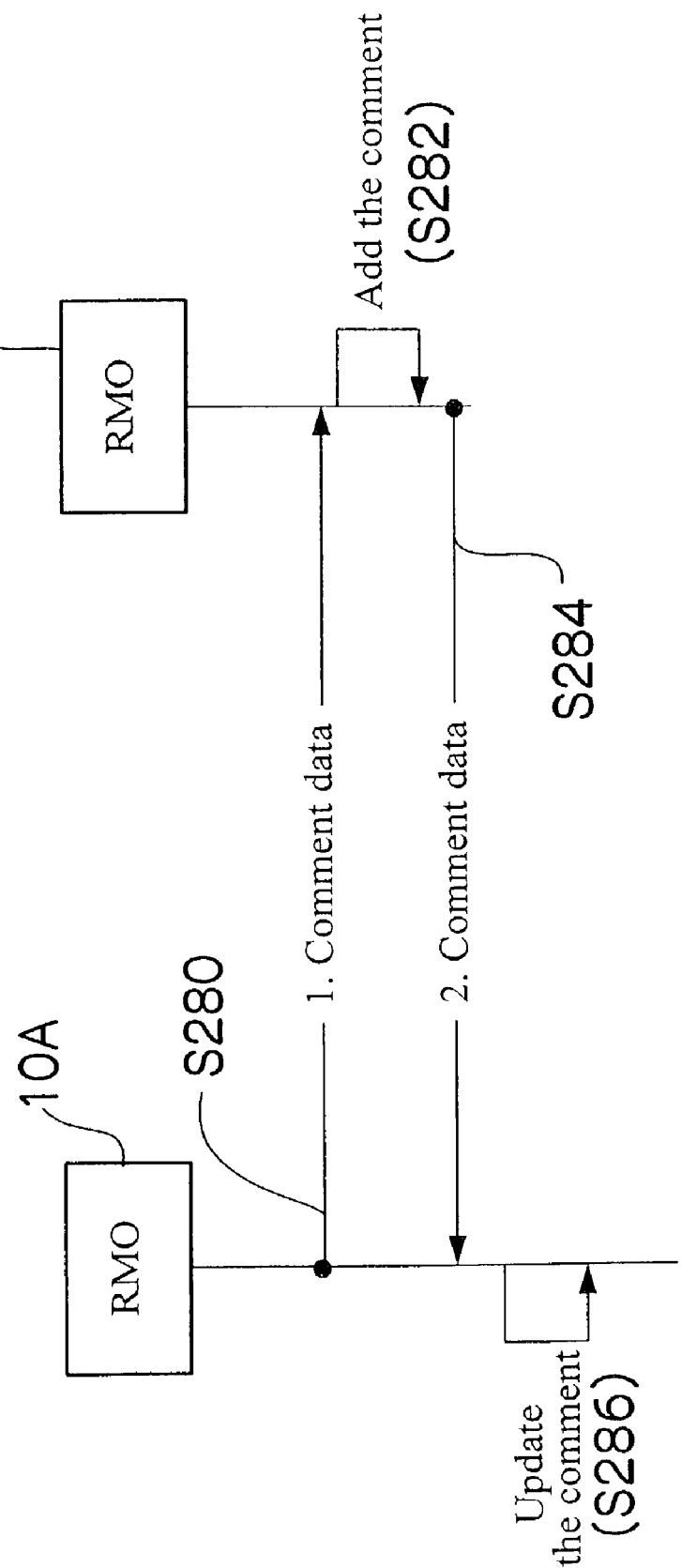
FIG. 11 is a sequence diagram showing a flow for adding a comment on an image of the other RMO between RMOs in a CUG.

FIG. 11 shows a sequence diagram for adding a comment to the image of the other RMO between RMOs in a CUG. In FIG. 11, a case of writing a comment on an image in the other RMO terminal 10B from the RMO terminal 10A is described below. It is possible to share the image stored in the RMO terminal 10B, view the image on the monitor of the RMO terminal 10A, and read the comment added to the image. To further add a comment to the image, the comment is inputted from the RMO terminal 10A and the comment data is transmitted to the RMO terminal 10B (step S280).

The RMO terminal 10B adds the received comment as the subsidiary information on the image (step S282) and returns the updated comment data to the RMO terminal 10A (step S284). By receiving the comment data, the RMO terminal 10A updates comment information (step S286).

Lab Server Section

Figure 12:
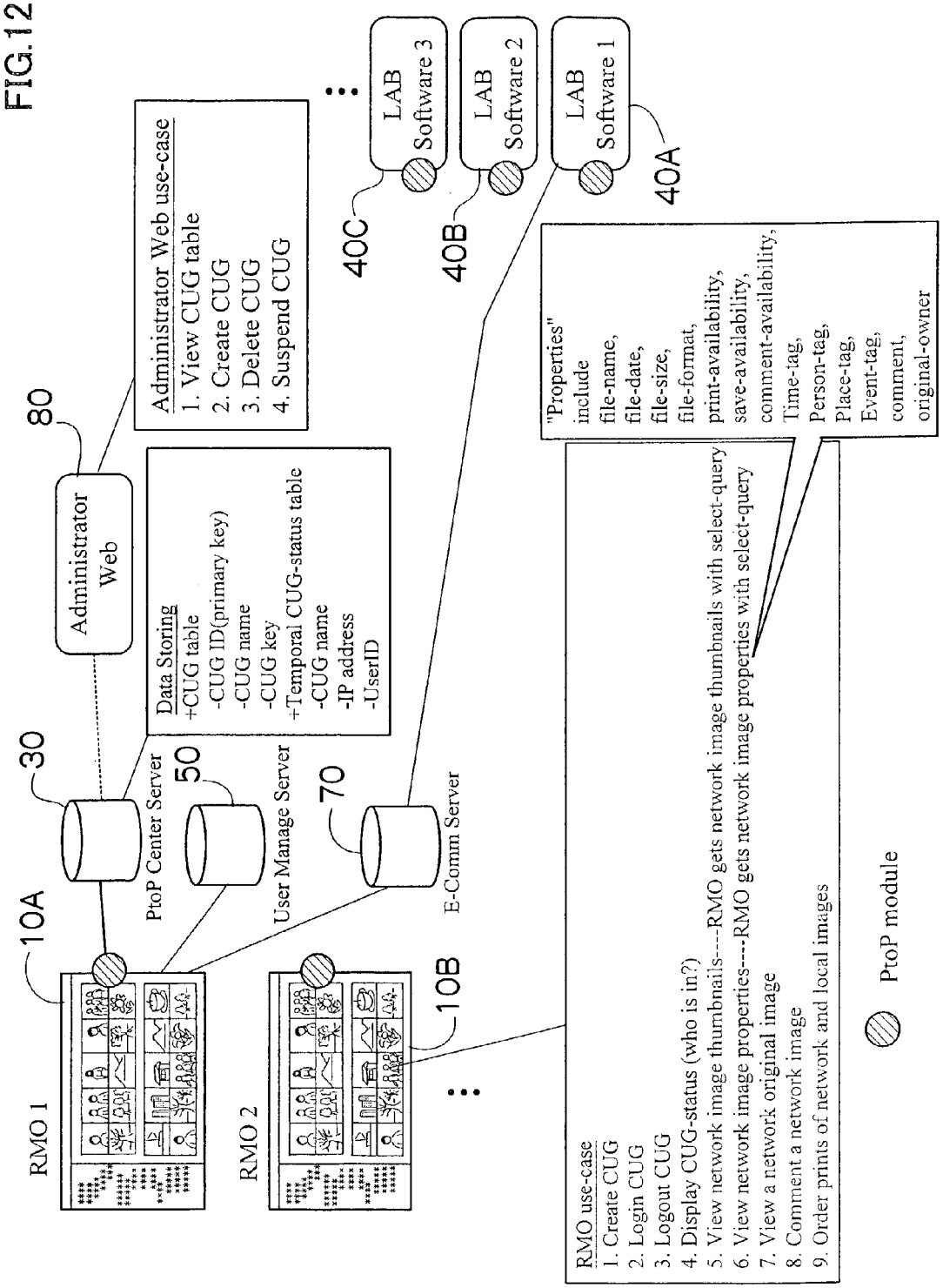
FIG. 12 is a schematic block diagram of a network system for realizing a print service.

Then, a flow for giving a print order to a lab is described below. FIG. 12 is a schematic block diagram of a system for realizing a printing service. In FIG. 12, a business aspect having a plurality of lab stores (chain stores) is described as an example. "Lab software 1, 2, 3, . . . " indicated with reference numerals 40A, 40B, 40C, . . . in FIG. 12 show servers (computers) of the lab stores and digital printers 42A, 42B, . . . are connected to the lab servers 40A, 40B, . . . , respectively, as described for FIG. 1.

As shown in FIG. 12, an enterpriser for generally managing chain stores sets a peer-to-peer directory server (PtoP server 30), client-managing server 50, and E-commerce (electronic transaction) server (hereafter referred to as EC server) 70 on a network. Functions of the PtoP server 30 are those described for FIGS. 5 to 10 and the sever 30 mainly manages CUGs.

A CUG table and a temporal CUG-status table are stored in the memory of the PtoP server 30. A CUG ID (primary key for identifying a record), CUG name, and issued CUG key (password) are stored in the CUG table by being related to each other.

Moreover, a presently-used CUG name and the IP address and user ID of an RMO logging in to the CUG are stored in the temporal CUG-status table.

The PtoP server 30 is connected with the server (operation-managing server) 80 of a business-operation manager via a network. The operation-managing server 80 has a function for reading a CUG table in the PtoP server 30, a function for issuing a new CUG password, a function for deleting a CUG, and a function for temporarily stopping the use of a CUG.

The client-managing server 50 is a server for storing and managing the private information on an RMO user, which stores and manages the information on the taste of the print quality (finish state) designated by the user when ordering prints and the depicting intention of each user.

The EC server 70 manages the information on lab stores, provides the information on lab stores for users, and generally manages the transaction between "user" and "lab" (in this case, providing of printing services), charging, and settlement of accounts.

Main functions of an RMO include:

(1) a function of requesting entry of a CUG;

(2) a function of logging into a CUG;

(3) a function of logging out from a CUG;

(4) a function of confirming and displaying a CUG status;

(5) a function of viewing thumbnail images exhibited on a network in a CUG;

(6) a function of reading subsidiary information on images exhibited on a network in a CUG (network images);

(7) a function of reading original images exhibited on a network;

(8) a function of writing a comment on a network image; and (9) a function of ordering prints of a network image and local image (images stored in the hard-disk drive of one's own).

The functions from (1) to (8) have been already described for FIGS. 5 to 11, and the function (9) of ordering prints will be described below.

Figure 13:
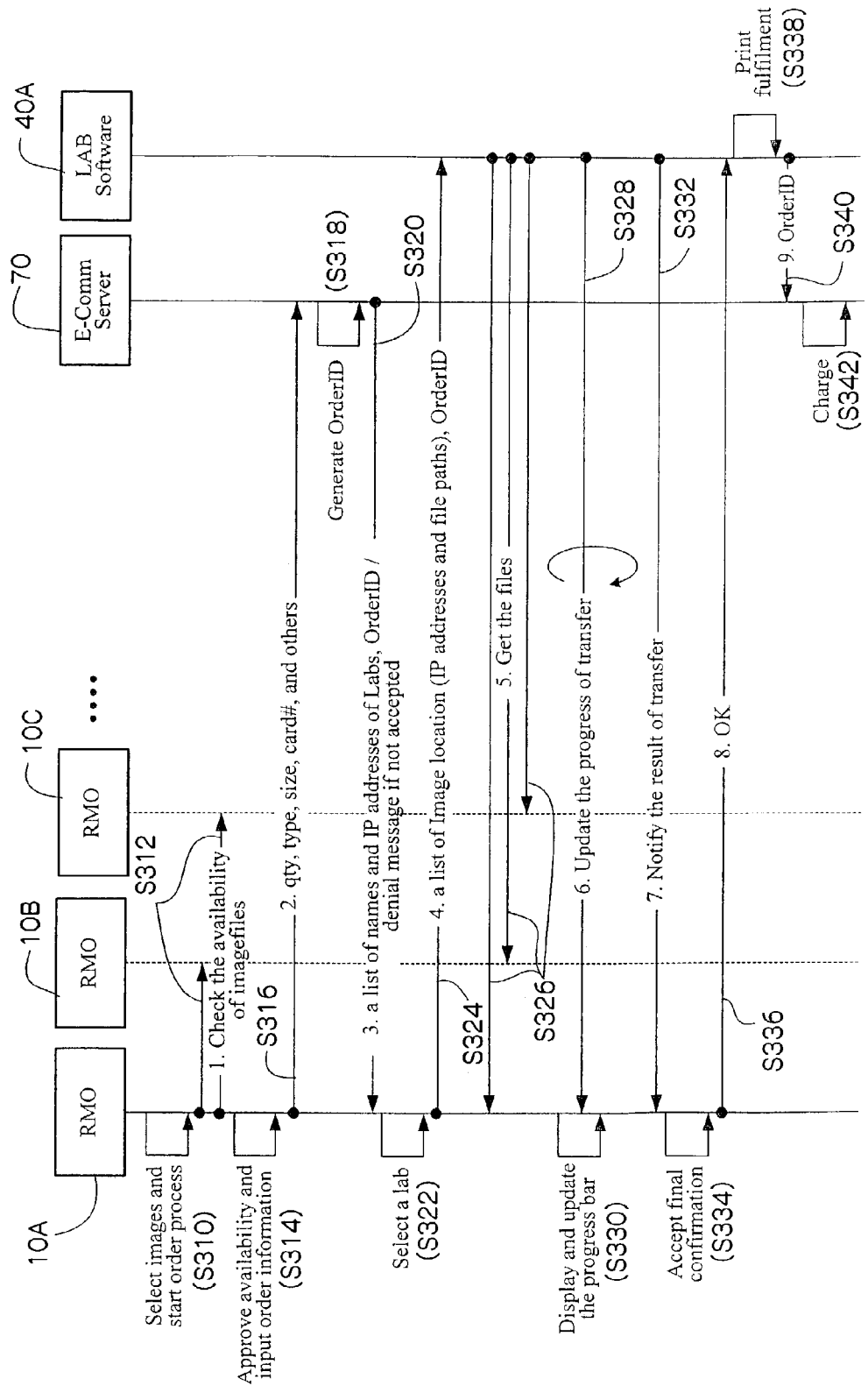
FIG. 13 is a sequence diagram showing a flow for ordering a print.

FIG. 13 is a sequence diagram showing a flow for ordering prints. In FIG. 13, a case is described in which the RMO terminal 10A orders prints of images of other RMO owners.

At the time of selecting an image of which print is desired and starting print ordering while viewing images on the RMO terminal 10A (step S310), the processing for confirming the permission of a print order is performed between RMOs (step S312). That is, a command for inquiring about whether to approve printing of the image file concerned is outputted from the RMO terminal 10A to other RMO terminals 10B, 10C, . . . The RMO terminals 10B, 10C, . . . receiving the above-described inquiry return the data showing whether to approve printing to the RMO terminal 10A.

When the RMO terminal 10A gets the information on approval of printing, the user inputs print order information through the RMO terminal 10A (step S316). The inputted ordering information is sent to the EC server 70 (step S316). The order information includes the number of prints, print type (necessity of luster/silky surface/white frame), print size, and credit-card number for settlement of accounts.

At the time of receiving the order information from the RMO terminal 10A, the EC server 70 generates an order ID (order-identifying information) for the order (step S318). Moreover, the EC server 70 manages the information on labs and shows the user the information on a lab store through which the user can receive prints (step S320). In this case, the EC server 70 selectively shows the information on lab stores close to the address of the user out of all lab stores.

That is, the EC server 70 communicates an order ID to an RMO user who is an orderer and moreover communicates a list of names and IP addresses of lab stores selected in accordance with the address information on the client concerned (step S320). On the other hand, when the EC server 70 cannot accept a print order from the orderer, it returns a denial message.

The information on lab stores is displayed on the monitor of the RMO terminal 10A that receives the list of lab stores from the EC server 70. In this case, an aspect is preferable in which lab stores are shown starting with a lab closest to the address of the user, lab stores are shown together with map information, or lab stores are listed on a map. Thus, the user can select the nearest store through which the user can easily receive prints (step S322).

Then, an RMO communicates an IP address for specifying a place for storing an image to be printed, file-path information, and order ID to the lab server (e.g., 40A) of the nearest store (step S324).

The lab server 40A for which a print order is requested gets image data relating to print designation via a network in accordance with the IP address and file-path information gotten from the RMO terminal 10A (step S326). That is, the image data to be printed is directly transmitted to the lab store from the RMO terminal that stores the image data without passing through a center server or the like.

The information showing a transfer state of the image data is transmitted from the lab server 40A to the RMO terminal 10A on occasion (step S328) and the transfer state is displayed on the monitor of the RMO terminal 10A by a progressive bar or the like.

When the image transfer is completed, the lab server 40A communicates the transfer result to the user (the RMO terminal 10A) who is an orderer and communicates that the print order is confirmed to the user again (step S332). When the RMO terminal 10A receives the final confirmation notice from the lab server 40A, a confirmation screen is displayed on the monitor of the RMO terminal 10A (step S334). When the user inputs a designation of OK, an OK signal is sent from the RMO terminal 10A to the lab server 40A (step S336).

The lab server 40A receives the OK signal from the RMO terminal 10A and then, starts printing (step S338). After the printing is completed, the lab server 40A communicates the executed order ID to the EC server 70 (step S340). The EC server 70 receives the executed order ID and executes charging to the user who is the orderer (step S342).

The above-described example is the embodiment of the present invention where the EC server 70 manages the information on labs and has a price list for each lab store, promotion information (such as discount service information for limited period), and the information on whether each lab store is on a network connection at present.

Embodying of the present invention is not restricted to the above-described example. It is also possible to realize a type of embodiment in which the PtoP server 30 manages these pieces of lab-managing information and the EC server 70 gets the information on IP addresses of labs through the PtoP server 30 and communicates the information to the RMO terminal 10A of a client.

Moreover, in the case of the above-described example, a type of a flow for a lab server (LabSoftware) to pull files in an RMO terminal of a client is described. To embody the present invention, it is also possible to use a system of ordering a print after temporarily getting the image of other RMO owner by the RMO terminal of one's own and then ordering a print of the image. In this case, a type of embodiment for "pushing" the image file to a desired lab server from the RMO can be present.

Image Processing by Lab Store

Figure 14:
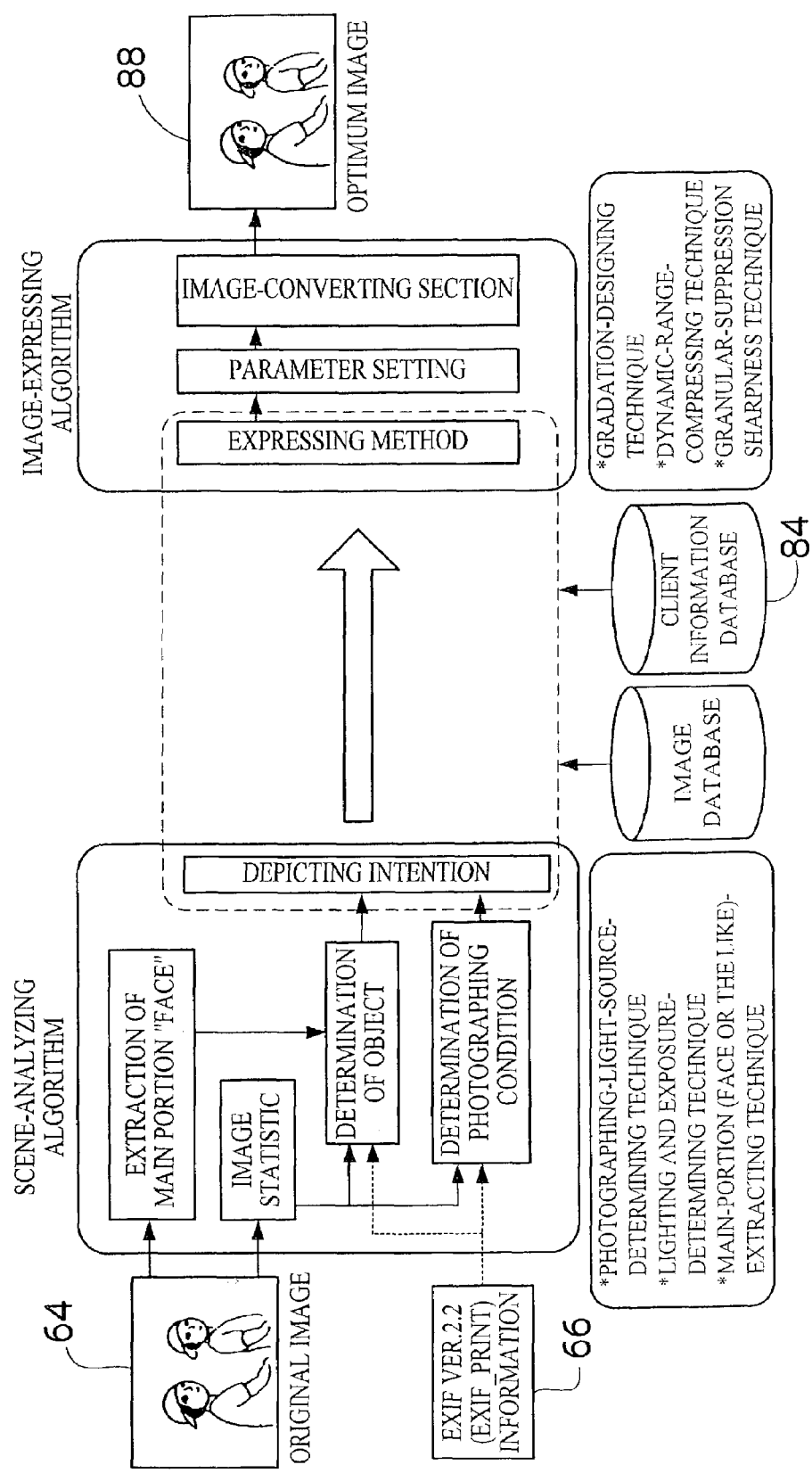
FIG. 14 is a conceptual view showing a flow for processing an image-processing algorithm by a digital printer set to a print station.

FIG. 14 shows an image-processing flow by a digital printer set to a lab store. The algorithm for image processing by the digital printer is basically the same as the image-processing algorithm of the RMO described for FIG. 4. However, the former algorithm is different from latter one in that an image-processing parameter is determined by referring to the favorite information of the user for the finish quality of a print from a client-information database 84 stored in the memory 52 of the client-managing server 50 so as to reflect the favorite of the user when setting the parameter.

Thus, an image is processed in accordance with the set parameter and an optimum print image 88 is generated.

Modification of Embodiment

In the case of the system described for FIGS. 12 to 14, a case is described in which the user selects a desired lab store out of a plurality of pieces of lab information presented by the EC server 70. Moreover, there is an aspect in which the number of lab stores to which a print can be requested is restricted to one or several places. It is also possible to compose software capable of giving a print order to only a specified lab store.

For example, a lab store prepares the software for RMO and the RMOs are distributed to users of the lab store and neighbors. A person who receives the RMO can make his own personal computer function as an RMO terminal by installing the RMO in the personal computer in his house.

It is assumed that the information on a lab store is in default preset to the information designated by the lab store in RMOs to be distributed by the lab store. Thereby, when the user of the RMO performs on-line printing, the user uses the lab store. Therefore, the lab store has an advantage that the store can keep the user.

Another Modification of Embodiment

In the case of the embodiment described for FIGS. 1 to 14, a personal computer is illustrated as a terminal unit (RMO terminal). To embody the present invention, however, a terminal unit is not restricted to a personal computer. For example, it is allowed to use an independent unit such as a mobile telephone or PDA as a terminal unit or form a terminal unit by a plurality of units such as a configuration in which a home server and a DVD player are combined.

Moreover, in the case of the above-described embodiment, a method of ordering a print via a network is described. However, it is also possible to print an image from each RMO terminal 10 by using a home printer (a printer set to home). The print station may include various aspects such as a lab, a print shop, a kiosk terminal installed in a convenience store and the like, and printing facilities used in the home.

Moreover, for FIG. 1, a configuration is described in which image data is inputted to the hard disk of an RMO terminal through a recording medium such as the digital camera 14 or memory card 16. However, to embody the present invention, an image-inputting method is not restricted to the above-described cases. For example, there is an aspect of wireless-uploading the image data photographed by a mobile telephone provided with a camera to the hard disk of an RMO terminal (aspect of transferring an image by wireless data transmission).

Furthermore, an aspect provided with a function capable of recognizing physical image-storing places distributed to a plurality of terminals in a house as one storing place is preferable as an additional function of the above-described RMO.

Main advantages of the above-described embodiments of the present invention will be summarized below.

(1) It is possible to automatically rearrange and integrate a large number of digital-camera images only by recording (copying) them into a hard disk.

(2) It is possible to simply and easily share an image through a CUG without processing any image while considering the capacity of a server space or without using an uploading step.

(3) It is possible to order a print by determining desired image-processing conditions (finish qualities such as slightly hard/slightly soft, sharp/mild, slightly bright/slightly dark, etc.).

(4) It is possible to realize the service of inexpensive prints with no postage by getting an ordered print from a nearest store (place desired by the user).

Moreover, as subsidiary advantages, it is possible not only for clients to get many facilities through the above-described system and service but also for lab stores to keep their clients.

According to the present invention, it is possible to realize an environment in which a limited number of persons can share an image through a peer-to-peer network and easily order a print having a desired finish quality without an uploading procedure. Moreover, it is possible to deliver a print ordered by the user at the nearest store and thereby reduce the print-service cost.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image-printing system, comprising:

a connection-managing server which enters a closed user group (CUG) in which a limited number of users share an image on a network, issues an authorization code necessary for login to the entered CUG while managing login/logout of user terminal units respectively, the user terminal units, each of which has the same authorization code issued by the connection-managing server, are peer-to-peer-connected with each other during communication between the user terminals and managing the peer-to-peer connection between the user terminal units on the network; and an order-accepting server which is peer-to-peer-connected with the user terminal units respectively having the same authorization code via the network, gets image data relating to a print order from each of the user terminal units, sends the image data to a digital printer set in a print station, and makes the digital printer execute printing in accordance with the image data; wherein the user terminal unit used for the image-printing system includes:

an image-getting device which gets image data from other peer-to-peer-connected user terminal unit;

an image-displaying device which displays an image represented with the image data gotten by the image-getting device so that the image is viewed;

an image memory which stores image data;

order-inputting unit through which an order is inputted for selecting at least one image from images stored in the other peer-to-peer connected user terminal unit and images stored in the image memory and requesting a print of the selected image, wherein at the time of requesting the print order, a processing for confirming a permission of the print is performed between the peer-to-peer connected user terminal units based on the same authorization code; and an order-managing server which receives a print order from each of the user terminal units via the network, issues an order ID every order, manages the information on a plurality of print stations, and provides information necessary for the peer-to-peer connection with the order-accepting server of one of the plurality of print stations selected by the user as a print-receiving place for the user terminal unit of the user ordering the print, wherein the order-accepting server includes a printing-completion-communicating device which communicates the order ID relating to completion of the printing relating to the order to the order-managing server when the print relating to the order is completed.

2. The image-printing system according to claim 1, wherein the connection-managing server receives an entry request for the CUG from the user terminal unit via the network, and enters the CUG and issues the authorization code in accordance with the request.

3. The image-printing system according to claim 1, further comprising a user management server which includes a user-information memory storing information on an image-processing condition designated by each user, the user management server reading the information on an image-processing condition of a user who is a print orderer from the user-information memory to provide the information for the print station.

4. The image-printing system according to claim 3, wherein the digital printer includes an image processor which processes an image in accordance with the information on the image-processing condition gotten from the user management server to generate a print image.

5. The image-printing system according to claim 1, wherein the order-managing server receives the order ID showing the completion of the printing from the printing-completion-communicating device and charges the printing service for the order ID.

6. The user terminal unit according to claim 1, further comprising a restriction-setting device which adds, when sharing images stored in the CUG, a restriction to a using method of the images.

7. The user terminal unit according to claim 6, wherein the restriction-setting device sets, on the basis of an operation of an image owner, at last one of permission and inhibition of at least one of viewing of the image, downloading of the image data, ordering of a print using the image data, and writing of a comment on the image.

8. A method for printing an image, comprising:
  entering a closed user group (CUG) in which a limited number of users share an image on a network,
  issuing an authorization code necessary for login to the entered CUG while managing login/logout of user terminal units respectively, the user terminal units, each of which has the same authorization code, a peer-to-peer-connected with each other during communication between the user terminals,
  managing the peer-to-peer connection between the user terminal units on the network;
  providing an order-accepting server which is peer-to-peer-connected with the user terminal units respectively having the same authorization code via the network,
  getting image data relating to a print order from each of the user terminal units,
  sending the image data to a digital printer set in a print station for printing in accordance with the image data;
  getting image data by an image-getting device from other peer-to-peer-connected user terminal unit;
  displaying an image represented with the image data gotten by the image-getting device so that the image is viewed;
  storing image data into an image memory; and
  inputting order for selecting at least one image from stored images in the other peer-to-peer connected user terminal unit and images stored in the image memory and requesting a print of the selected image, wherein at the time of requesting the print order, a processing for confirming a permission of the print order is performed between the peer-to-peer-connected user terminal units based on the same authorization code; and
  providing an order-managing server which receives a print order from each of the user terminal units via the network, issues an order ID every order, manages the information on a plurality of print stations, and provides information necessary for the peer-to-peer connection with the order-accepting server of one of the plurality of print stations selected by the user as a print-receiving place for the user terminal unit of the user ordering the print, wherein
  the order-accepting server includes a printing-completion-communicating device which communicates the order ID relating to completion of the printing relating to the order to the order-managing server when the print relating to the order is connected.

9. The method according to claim 8, further comprising: receiving an entry request for the CUG from the user terminal units via the network, and entering the CUG and issuing the authorization code in accordance with the request.

10. The method according to claim 8, further comprising: providing a user management server which includes a user-information memory storing information on an image-processing condition designated by each user, the user management server reading the information on an image-processing condition of a user who is a print orderer from the user-information memory to provide the information for the print station.

11. The method according to claim 10, wherein the digital printer includes an image processor which processes an image in accordance with the information on the image-processing condition gotten from the user management server to generate a print image.

12. The method according to claim 8, wherein the order-managing server receives the order ID showing the completion of the printing from the printing-completion-communicating device and charges the printing service for the order ID.

13. The method according to claim 8, further comprising: adding, when sharing images stored in the image memory in the CUG, a restriction to a using method of the images.

14. The method according to claim 13, further comprising: setting, on the basis of an operation of an image owner, at last one of permission and inhibition of at least one of viewing of the image, downloading of the image data, ordering of a print using the image data, and writing of a comment on the image.

* * * * *